United States Patent [19]

Wong

[11] Patent Number: 5,856,376
[45] Date of Patent: Jan. 5, 1999

[54] TIRE PUNCTURE SEALANT

[75] Inventor: Daniel W. Wong, Plano, Tex.

[73] Assignee: NCH Corporation, Irving, Tex.

[21] Appl. No.: 811,102

[22] Filed: Mar. 3, 1997

Related U.S. Application Data

[60] Provisional application No. 60/014,406 Mar. 29, 1996.
[51] Int. Cl.$^6$ ................ B29C 73/16; C08J 3/20
[52] U.S. Cl. .............. 523/166; 523/351; 524/376; 524/377; 524/388; 524/389; 524/511; 152/504; 521/42.5
[58] Field of Search ................ 523/166, 351; 524/376, 377, 388, 389, 511; 152/504; 521/42.5

[56] References Cited

U.S. PATENT DOCUMENTS

| | | | |
|---|---|---|---|
| 3,860,539 | 1/1975 | Miyazato | 523/166 |
| 4,501,825 | 2/1985 | Mayyar et al. | 523/166 |
| 4,880,879 | 11/1989 | Bauman | 525/130 |
| 5,059,636 | 10/1991 | Grenga | 523/166 |
| 5,382,635 | 1/1995 | McInnis et al. | 525/356 |

OTHER PUBLICATIONS

M.J. Gerace, PH.D., J.M. Gerace and M.A. Williams, "The Use of Vistamer™ Surface–Activated Rubber Particles in Structural Adhesives", Aug. 2, 1995 Rev. 3.

M.A. Williams, B.D. Bauman and D.A. Thomas, "Incorporation of Surface–Modified UHMWPE Powders and Fibers in Tough Polyurethane Composites", *Polymer Engineering and Science,* Mid–Jul. 1991, vol. 31, No. 13, pp. 992–998.

NCH Corporation, *Tire Sealant and Conditioner, Booklet of Tire Sizes and Application Rates* 25–0814(9M610), 1996.

Confidential Statement of Formula, Product Name: Air Patrol, NCH Corporation, 1989 (i.e., upon information and belief, first marketed in 1989).

*Primary Examiner*—James J. Seidleck
*Assistant Examiner*—Olga Asinovsky
*Attorney, Agent, or Firm*—Locke Purnell Rain Harrell, P.C.; Monty L. Ross

[57] ABSTRACT

A tire puncture sealant containing water in an amount of from about 6% to about 64% by weight; ethylene glycol in an amount of from about 36% to about 94%; styrene butadiene latex in an amount of about 3%; polyethylene powder and ground rubber in an amount from about 3% to about 6%; a minor effective amounts of an alkali metal carbonate, a cellulosic thickener, an alkali metal nitrite and a corrosion inhibitor. The polyethylene powder and ground rubber are preferably surface-activated and include various particle sizes.

27 Claims, No Drawings

TIRE PUNCTURE SEALANT

CROSS-REFERENCE TO RELATED APPLICATIONS

The present application claims priority based on Provisional Application No. 60/014,406, filed Mar. 29, 1996.

BACKGROUND OF THE INVENTION

1. Field of the Invention

This invention relates to sealants suitable for use as puncture sealants in pneumatic tires, and more particularly, to a flowable tire puncture sealant composition containing surface-activated, particulate polymeric material dispersed in latex.

2. Description of Related Art

The problems associated with the loss of air from punctures in pneumatic tires are well known. Although the concept of injecting various compositions into a tire to seal punctures has also been known for some time, many of the prior art compositions proposed to date suffer from a variety of disadvantages. One of the principal disadvantages of prior art tire puncture sealant compositions has been the tendency of fibrous materials used in the conventional compositions to clump and ball up prior to entering the puncture. Inadequate sealing results when sealant fluid enters a puncture without the accompanying fibrous material. Some tires are manufactured with a liner and a built-in sealant, but they tend to be more expensive. Furthermore, such tires are typically only available for nominal sizes of 13–15 inches.

A tire puncture sealant is therefore needed that will evenly coat the interior tire surface along the tread area, that will not "puddle" at the bottom of the tire, that will satisfactorily seal punctures, and that will not react adversely with or damage other parts of the tire or wheel.

SUMMARY OF THE INVENTION

A tire puncture sealant is disclosed herein that preferably comprises a particulate, surface-activated, polymeric component dispersed in a fluid medium further comprising water, a freeze preventative, and an additive package. The particulate polymeric component is preferably selected from powdered tire rubber, a powdered polyolefinic resin such as ultra high molecular weight polyethylene ("UMHW PE"), or most preferably, a combination thereof. The antifreeze component is preferably an alkyl polyol such as ethylene glycol. A preferred additive package for use in the invention includes minor effective amounts of calcium carbonate, sodium metasilicate (pentahydrate), polysaccharide xanthan gum, sodium nitrite and an SBR latex. As used herein in conjunction with the particulate polymeric component of the invention, the term "surface-activated" refers to polymeric material that has been pretreated by contacting it with a reactive oxidizing gas to create polar groups on the particle surface and thereby increase the surface energy, wettability and adhesion of such particles. Surface activation is believed to aid dispersion of the polymeric particles througout the SBR latex and also to aid dispersion of the polymeric particles into a puncture.

The tire puncture sealant of the invention is desirably used by injecting it through the valve stem of a depressurized pneumatic tire. A preferred application rate for the subject tire sealant ranges from about 4 ounces up to about 350 ounces or more per tire, depending upon the tire size and usage. Publication No. 25-0814 (1996) titled "Tire Sealant and Conditioner" stating preferred application rates for the subject sealant for a wide variety of commercially available tire sizes and usages is publicly available from NCH Corporation, 2727 Chemsearch Blvd., Irving, Tex. 75062, and is incorporated by reference herein. A higher application rate is generally preferred for large tire sizes and for off-road vehicles, while the preferred application rate for pneumatic tires having significantly lower volumes, such as boat or motorcycle tires, is lower. Once the tire is repressurized, the sealant flows into any puncture in the tire, and the surface-activated, particulate polymeric component is carried into the puncture to bond with the tire rubber surrounding the puncture and thereby form a seal, preventing further air loss.

According to one preferred embodiment of the invention, a tire puncture sealant is provided that comprises up to about 90% or more by weight of a mixture of water and a freeze preventative; from about 3% to about 5% or more by weight of a surface-activated, powdered polymeric material selected from the group consisting of crushed and ground, recycled post-consumer tire material tire rubber, ultra high molecular weight polyethylene, and mixtures thereof; and about 5% by weight of an additive package further comprising about 3% by weight of the total composition of an SBR latex, and minor effective amounts of other conventional additives such as an alkali metal carbonate, a corrosion inhibitor, a thickener and an oxidizer.

According to another preferred embodiment of the invention, the powdered polymeric material used in making the subject tire sealant includes a plurality of particle sizes to facilitate sealing different sized punctures.

DETAILED DESCRIPTION

The tire puncture sealant of the invention preferably comprises a particulate, surface-activated, polymeric component dispersed in a fluid medium further comprising water, a freeze preventative, and typical additives such as an alkali metal carbonate, a corrosion inhibitor, a thickener, an oxidizer and a latex, preferably an SBR (styrene butadiene rubber) latex, to promote dispersion throughout the sealant composition.

Preferred particulate polymeric components for use in the tire puncture sealant disclosed herein are powdered tire rubber, plastic, and mixtures thereof. As demonstrated in the table titled "Formulations for Tire Puncture Sealant," discussed in greater detail below, compositions of the invention have been successfully prepared using as the surface-activated, powdered polymeric component: recycled tire tread buffings; recycled tire tread buffings in combination with post-consumer tire rubber; ultra high molecular weight polyethylene; recycled tire tread buffings in combination with UHMW PE; post-consumer tire rubber in combination with UHMW PE; and recycled tire tread buffings in combination with post-consumer tire rubber and UHMW PE. Particle sizes of the particulate polymeric components as disclosed in the table ranged from about 35 to about 2000 microns, with the greatest usage being particles ranging in size from about 125 to about 850 microns. The simultaneous use of particles of various sizes is preferred to facilitate sealing punctures of various sizes, and also to provide smaller particles to fill the interstices between larger particles within a puncture. Although UHMW PE is the only polyolefinic resin tested to date because it is the only commercially available, surface-activated polyolefinic resin powder known to applicant, it is believed that other powdered plastic resins, if surface-treated in the same manner, will be similarly effective for use in the tire puncture sealant of the invention.

The ground rubber employed in the instant tire puncture sealant composition is recognized by those skilled in the art as post-consumer tire material which has been ground up, and processed for removal of unneeded fibrous and metal material, under closely controlled conditions. The inventor has discovered that desired ground rubbers for the instant invention are those having a specific gravity of from about 1.15 to about 1.20.

More importantly, it has been discovered that a particularly effective embodiment of the invention features the use of a ground rubber mixture of at least three differently sized ground rubbers. One effective embodiment employs a mixture of 100 mesh ground rubber, 60 mesh ground rubber, and 40 mesh ground rubber. A particularly effective form of the contacted ground rubber is one having a surface tension of at least about 55 dynes/cm, a bulk density of from about 24.0 lb/ft$^3$ to about 28.0 lb/ft$^3$, a specific gravity of from about 1.15 to about 1.20, and a moisture content of about 1% by weight.

In a highly effective embodiment of the invention, the ground rubber has specifically been treated according to treatment methods specified in U.S. Pat. No. 5,382,635, McInnis, Edwin L., Scharff, Robert P., Bauman, Bernard D., and Williams, Mark A., "Higher Modulus Compositions Incorporating Particulate Rubber" (issued Jan. 17, 1995), which is also incorporated by reference herein. In the '635 patent, McInnis et al. describe methods for preparing (and certain specific utilities for) ground rubber particles which have been contacted with chlorine gas for a period of time adequate to increase the bulk chlorine content of the ground rubber to between about 0.5% and about 10% by weight of ground rubber.

A particularly effective mixture of differently sized contacted ground rubbers features a mixture of 100 mesh (150 microns) particles constituting about 1% by weight of the tire puncture sealant; 60 mesh (250 microns) particles constituting about 0.5% by weight of the tire puncture sealant; and 40 mesh (425 microns) particles constituting about 0.5% by weight of the tire puncture sealant. Those of ordinary skill in the art will appreciate upon reading this disclosure that the stated weight percents are illustrative rather than limitative, with the weight percent ratio of about 2:1:1 for the stated particle sizes merely being preferred.

Readers of ordinary skill in the art will be aware of different sources of the above-referenced rubbers. To facilitate the ready practice of the invention, the reader is directed to one such source: Composite Particles, Inc., 2330 26th Street SW, Allentown, Pa. 18103. Composite Particles produces VISTAMER™ RUBBER, a ground rubber having the above-referenced properties (e.g., R-4030, R4040, R-4060, R-4100 and R4200 for tire tread buffings; RW4010, RW 4020, RW4030, RW4040 and RW4060 for ground post-consumer tire rubber).

The polyethylene powder is most preferably an ultra high molecular weight polyethylene powder. In preferred embodiments of the invention, the UHMW PE powder is a surface activated highly dispersable powder having a specific gravity of from about 0.93 to about 0.95, a melting point of at least about 127° C., and, still more preferably, an average particle size which is greater than about 700 mesh.

In a highly effective embodiment of the invention, the UHMW PE powder has specifically been treated according to treatment methods specified in U.S. Pat. No. 4,880,879, Bauman, Bernard D., "Abrasion Resistant Composite Material and Process for Making the Same" (issued Nov. 14, 1989), which is incorporated by reference herein. In the '879 patent, Bauman describes methods for preparing (and certain specific utilities for) HMW PE particles which have been treated in such a way that their surface tension is increased to at least about 40 dynes/cm at 20° C.

The inventor has discovered that a particularly effective form of treated UHMW PE powder is one having a surface tension of at least about 55 dynes/cm, a bulk density of from about 25.3 lb/ft$^3$ to about 30.8 lb/ft$^3$, a specific gravity of from about 0.93 to about 0.95, and a melting point of at least about 127° C. It has also been discovered that the particle size of the treated UHMW PE particles can be adjusted to yield superior results. The preferred range is an average particle size of between about 15 microns and about 600 microns, more preferably between about 35 microns and about 290 microns, and still more preferably an average particle size of about 125 microns.

Readers of ordinary skill in the art will be aware of different sources of the above-referenced classes of materials. To facilitate the ready practice of the invention, the reader is again directed to one such source: Composite Particles, Inc., 2330 26th Street SW, Allentown, Pa. 18103. Composite Particles produces VISTAMER™ UH, an UHMW PE powder having the above-referenced properties (e.g., UH-1060; UH-1080; UH-1250; UH-1500; UH-1700).

The tire puncture sealant of the invention will desirably have a viscosity ranging from about 1500 to about 20,000 centipoise and be operable over a temperature range extending from about −40° F. to about 212° F. The freeze preventative component of the subject tire puncture sealant is preferably an alkyl polyol such as, for example, ethylene glycol, propylene glycol or glycerine, that will suppress the freezing point of the tire sealant composition to the lowest temperature level typically encountered during shipping, storage and normal service.

The tire puncture sealant of the invention preferably comprises about 3% by weight of the total composition of a latex fluid, preferably an SBR latex such as CP 4125, although it will be appreciated that other similarly effective materials and lesser or greater amounts can be similarly utilized within the scope of the invention, dependent upon the type and amounts of other components utilized and the particular intended application. The preferred SBR latex functions as a carrier and dispersant for the particular polymeric component of the tire sealant and for conventional, commercially available additives known to those of ordinary skill in the art for use in such systems or compositions. A preferred additive package for use in the invention includes minor effective amounts of an alkali metal carbonate such as calcium carbonate, a corrosion inhibitor such as sodium metasilicate (pentahydrate), a thickener such as polysaccharide xanthan gum, and alkali metal nitrites such as sodium nitrite, all dispersed in an SBR latex.

In the practice of the invention it has been discovered that particularly useful embodiments result from the combination of the components within preferred ranges of concentration. Particularly preferred formulations for the subject composition are disclosed in the accompanying table, but it is emphasized that the disclosed formulations are merely exemplary of a wide variety of similarly effective formulations that can be used within the scope of the invention.

Water preferably comprises from about 6% to about 64%, and most preferably from about 45% to about 50%, by weight of the tire puncture sealant. Ethylene glycol preferably comprises from about 36% to about 94%, and most preferably about 43% by weight of the tire puncture sealant.

The particulate polymeric component preferably comprises from about 3% to about 6% by weight of the tire puncture sealant, and most preferably comprises from three to six different nominal particle sizes, with from about 0.5% to about 2% by weight of the tire puncture sealant of any particular nominal particle size.

Polyethylene powder is preferably present in an amount of from about 0.1% to about 5%, and most preferably from about 1% to about 3% by weight of the tire puncture sealant. Ground rubber is preferably present in an amount of from about 0.1% to about 5%, and most preferably from about 2% to about 5% by weight of the tire puncture sealant.

As shown in the table, exemplary minor effective amounts of additives for use in the tire puncture sealant of the invention include about 0.5% alkali metal carbonate, about 0.5% corrosion inhibitor, about 0.7% cellulosic thickener, and about 0.5% alkali metal nitrite, by weight of the total composition.

According to one particularly preferred embodiment of the invention, the tire puncture sealant is made in batches as large as 800 to 1000 gallons by the process described below. It will be appreciated by those of ordinary skill in the art upon reading this disclosure, however, that the compositions of the invention can also be made in different amounts and by using different methods or apparatus.

First, the ethylene glycol is charged to a mixing tank, such as a Hochmeyer tank fitted with a cone bottom design and one dispersion-type, straight-down blade mixer. The water is added and agitation is begun at a speed which will result in effective mixing. Next, the polymeric component is added, most preferably the polyethylene powder, followed by the ground rubber particles. The alkali metal carbonate, cellulosic thickener, alkali metal nitrite, and corrosion inhibitor are premixed for about five minutes and the premix is then added to the formulation by sprinkling gradually. The composition is then is mixed at high shear for about 30 minutes or until the texture is uniform and smooth. Finally, the styrene butadiene rubber is added and mixing continues for about 20 minutes or until the mixture is uniform and smooth.

The most preferred embodiment of the tire puncture sealant composition disclosed herein is an opaque, gray, viscous liquid with a slight styrene odor. It is dispersible with water, and it displays the following properties: a density of about 8.5 lb/gal @25° C. (v. $H_2O$ Density 8.33 lb/gal); a specific gravity of about 1.02 (via the gravimetric method); a viscosity of from about 2400 to about 3400 cps, preferably about 2900 cps (via Brookfield Viscosity Test @20 rpm); an initial boiling point of about 222° F. (from literature); a vapor pressure of about 7.76 mm Hg @20° C./68° F. (calculated); a vapor pressure of about 1.035 KPa (calculated); a vapor density of about 0.30 (Air=1) (calculated); an evaporation rate (BuAc=1) of about 0.94 (calculated); a VOC (Volatile Organic Content) of about 43.3% (formula), about 441 g/L (calculated), and about 3.75 lb/gal (calculated); a percent volatiles by volume of about 90.4% (calculated); a flash point greater than about 225° F. (via Penske Martins Test); a pH of from about 8 to about 11, preferably about 10.4 (10% solution via a pH meter); a solubility in water of about 96.5%; and a particle size distribution featuring lumps no larger than about 1/8 inch.

During preparation of the tire puncture sealant, if the viscosity falls below the desired value, a small addition of thickener should correct the condition. If the viscosity exceeds the target, a small addition of water is appropriate and helpful. If the pH falls below the targeted value, a small addition of the alkali metal metasilicate should correct the condition. If the pH or average particle size rise above the targeted values, supplemental mixing has occasionally effected the desired reduction.

Product stability was evaluated in glass olive bottles with Teflon-lined lids. No deviations in packaging were noted due to reactivity problems with glass, and no changes in color, changes in odor, formation of a precipitate, formation of a phase separation/stratification, caking, or settling, were observed over 50 days at room temperature (i.e., 25° C./77° F.), over 30 days at elevated temperature (i.e., 50° C./122° F.), or over 30 days at a depressed freeze/thaw temperature (i.e., −15° C./5° F.). Thus, the product may be conveniently stored inside, outside, or in freezing or heated conditions.

The tire puncture sealant of the invention is desirably used as follows: The tire into which the sealant is to be applied should desirably be balanced. With the valve stem in the 6 o'clock position, the air from the tire is released by removal of the valve core. An effective amount of sealant is then introduced.

Typical industry standard application rates for sealants of this type are about 40 ounces per truck tire for ordinary highway use and about 1 gallon per truck tire for offroad use. The internal thread of the valve stem is then cleaned by injecting air into the tire and allowing it to flush out. Finally, the valve core is reinstalled and the tire is inflated to the recommended pressure.

The tire puncture sealant of the invention is believed to be effective at tire pressures ranging from about 5 to about 120 psi, and the formulations disclosed in the accompanying table have performed successfully in leak tests conducted on pneumatic tires inflated to about 40 psi. While the exact mechanism by which the sealant effects its purpose is not clearly known and the inventor, therefore, desires not to be limited by his hypotheses on the matter, it is believed that the hydrophilic surface-modified UHMW PE component and ground rubber particles are carried into the puncture by the SBR latex component and cooperate with the alkali metal carbonate to produce the necessary seal inside the puncture. The hydrophilic tendency of the surface modified UHMW PE particles is also believed to promote the dispersion of the plastic component throughout the composition to assist in plug formation.

Although the composition of the invention is disclosed and described herein primarily as a puncture sealant for use in truck and automobile tires, those of ordinary skill in the art will appreciate upon reading this disclosure that the compositions of the invention also have utility in other types of tires (trailers, bikes, motorcycles, lawn mowers, wheelchairs, etc.) and for non-tire applications such as an adhesive for roofing materials or the like, where adhesion may be improved through use of the surface-activated polymeric materials.

While several embodiments of the invention have been shown and described, other variations (which are in reality equivalents) will be readily apparent to those of ordinary skill in the art. Thus, the invention is not limited to these embodiments but, rather, is intended to cover all such variations as may be within the scope of the invention as defined by the following claims.

Formulations for Tire Puncture Sealant

|  | Microns | _____Examples_____ | | | | | | | | | | |
|---|---|---|---|---|---|---|---|---|---|---|---|---|
|  |  | 1 | 2 | 3 | 4 | 5 | 6 | 7 | 8 | 9 | 10 | 11 |
| Water |  | 48.5 | 46.5 | 47 | 46 | 48 | 48 | 46.5 | 46.25 | 46.25 | 45.75 | 46.5 |
| Ethylene Glycol |  | 43.3 | 43.3 | 43.3 | 43.3 | 43.3 | 43.3 | 43.3 | 43.3 | 43.3 | 43.3 | 43.3 |
| R4010 | 2000 |  | 0.5 |  |  | 0.5 |  | 0.5 | 0.5 |  | 0.5 |  |
| R4030 | 600 |  | 1 |  |  | 1 | 1 |  | 1 |  |  | 2 |
| R4040 | 425 | 0.5 |  |  | 1 | 1 |  | 1 |  | 1 |  |  |
| R4060 | 250 | 0.5 | 1 |  |  |  |  | 1 |  |  |  |  |
| R4100 | 150 | 1 | 1 |  |  |  |  | 1 |  |  | 0.5 |  |
| R4200 | 75 |  | 0.5 |  |  |  |  | 0.5 |  |  |  |  |
| RW4010 | 2000 |  |  | 0.5 |  |  | 0.5 |  |  | 0.5 |  |  |
| RW4020 | 850 |  |  | 1 |  |  |  | 1 |  | 1 | 1 |  |
| RW4030 | 600 |  |  | 1 |  |  |  | 1 |  | 1 | 1 |  |
| RW4040 | 425 |  |  | 1 |  |  |  |  |  |  |  | 2 |
| RW4060 | 250 |  |  | 0.5 |  | 1 | 1 |  |  |  |  | 1 |
| UH1060 | 290 |  |  |  | 2.5 |  |  |  | 1 | 1 | 1 |  |
| UH1080 | 125 | 1 |  |  | 1.5 |  |  |  | 1 | 1 |  |  |
| UH1250 | 60 |  |  |  | 0.5 |  |  |  | 0.25 | 0.25 | 0.25 |  |
| UH1500 | 45 |  |  |  | 0.5 |  |  |  | 0.25 | 0.25 | 0.25 |  |
| UH1700 | 35 |  |  | 0.5 | 0.5 |  |  |  | 0.25 | 0.25 | 0.25 |  |
| Additive A |  | 0.5 | 0.5 | 0.5 | 0.5 | 0.5 | 0.5 | 0.5 | 0.5 | 0.5 | 0.5 | 0.5 |
| Additive B |  | 0.5 | 0.5 | 0.5 | 0.5 | 0.5 | 0.5 | 0.5 | 0.5 | 0.5 | 0.5 | 0.5 |
| Additive C |  | 0.7 | 0.7 | 0.7 | 0.7 | 0.7 | 0.7 | 0.7 | 0.7 | 0.7 | 0.7 | 0.7 |
| Additive D |  | 0.5 | 0.5 | 0.5 | 0.5 | 0.5 | 0.5 | 0.5 | 0.5 | 0.5 | 0.5 | 0.5 |
| Additive E |  | 3 | 3 | 3 | 3 | 3 | 3 | 3 | 3 | 3 | 3 | 3 |
| TOTAL |  | 100.5 | 100 | 100 | 100 | 100 | 100 | 100 | 100 | 100 | 100 | 100 |

Additives:
A Calcium Carbonate
B Sodium Metasilicate (pentahydrate)
C Polysaccharide Xanthan Gum
D Sodium Nitrite
E SBR Latex

I claim:

1. A sealant composition comprising a particulate, surface-activated, polymeric component dispersed in a fluid medium comprising water, a freeze preventative selected from alkyl polyols, and latex;
   wherein the particulate polymeric component is selected from the group consisting of particles of rubber and polyethylene, said particles having a particle size ranging from about 35 to about 2000 microns that have been contacted with chlorine gas and are present in an amount ranging from about 3% to about 6% by weight of the composition.

2. The composition of claim 1 wherein the particulate polymeric component comprises tire rubber.

3. The composition of claim 1 wherein the particulate polymeric component is rubber.

4. The composition of claim 1 wherein the particulate polymeric component is polyethylene.

5. The composition of claim 1 wherein the polyethylene is ultra high molecular weight polyethylene.

6. The composition of claim 1 wherein the particulate polymeric component comprises a mixture of tire rubber and polyethylene.

7. The composition of claim 1 wherein the particulate polymeric component comprises at least three different particle sizes.

8. The composition of claim 7 wherein each particle size is present in an amount ranging from about 0.5% to about 2% by weight of the composition.

9. The composition of claim 1 wherein the latex is an SBR latex.

10. The composition of claim 1 wherein the latex is present in an amount of about 3% by weight of the composition.

11. The composition of claim 1 wherein the freeze preventative is selected from the group consisting of ethylene glycol, propylene glycol, and glycerine.

12. The composition of claim 1 comprising from about 45% to about 50% water, from about 40 to about 45% freeze preventative, and about 3% latex.

13. The composition of claim 1, further comprising an alkali metal carbonate.

14. The composition of claim 1, further comprising a cellulosic thickener.

15. The composition of claim 1, further comprising an alkali metal nitrite.

16. The composition of claim 1, further comprising a corrosion inhibitor.

17. A tire puncture sealant comprising the composition of claim 1.

18. The composition of claim 1 wherein the polyethylene is in the form of a surface-activated, highly dispersable, ultra high molecular weight polyethylene powder having a specific gravity of from about 0.93 to about 0.95, and a melting point of at least about 127° C.

19. The composition of claim 5 wherein the ultra high molecular weight polyethylene is a powder having an average particle size greater than about 700 mesh.

20. The composition of claim 18 wherein the polyethylene powder is an ultra high molecular weight polyethylene powder having a surface tension of at least about 40 dynes/cm at about 200° C.

21. The composition of claim 19 wherein said ultra high molecular weight polyethylene powder has an average particle size of between about 15 microns and about 600 microns.

22. The composition of claim 21 wherein said ultra high molecular weight polyethylene powder has an average particle size of between about 35 microns and about 290 microns.

23. The composition of claim 22 wherein said ultra high molecular weight polyethylene powder has an average particle size of about 125 microns.

24. The composition of claim 1 wherein the particulate polymeric component is a mixture of 100 mesh ground rubber, 60 mesh ground rubber, and 40 mesh ground rubber.

25. The composition of claim 24 wherein the ground rubbers have a specific gravity of from about 1.15 to about 1.20.

26. The composition of claim 1 wherein the rubber is in the form of a surface-activated, highly dispersible rubber powder having a specific gravity of about 1.1 to about 1.2.

27. A tire puncture sealant comprising:

water in an amount of from about 6% to about 64% by weight of said tire puncture sealant;

ethylene glycol in an amount of from about 36% to about 94% by weight of said tire puncture sealant;

styrene butadiene latex fluid in an amount at least about 3% by weight of the tire puncture sealant;

chlorine contacted polyethylene powder in an amount of from about 0.1% to about 5% by weight of said tire puncture sealant;

chlorine contacted ground rubber in an amount of from about 0.1% to about 5% by weight of said tire puncture sealant;

about 0.5% by weight of an alkali metal carbonate;

a cellulosic thickener in an amount of from about 0.1% to about 5% by weight of said tire puncture sealant;

an alkali metal nitrite in an amount of about 0.5% by weight of said tire puncture sealant; and a corrosion inhibitor in an amount of from about 0.1% to about 5% by weight of said tire puncture sealant.

* * * * *

UNITED STATES PATENT AND TRADEMARK OFFICE
CERTIFICATE OF CORRECTION

PATENT NO. : 5,856,376

DATED : January 5, 1999

INVENTOR(S) : Daniel W. Wong

Page 1 of 2

It is certified that error appears in the above-identified patent and that said Letters Patent is hereby corrected as shown below:

Col. 1, line 58
 replace "througout"
 with --throughout--.

Col. 2, line 19
 replace "recycled post-consumer tire material tire rubber"
 with --recycled post-consumer tire rubber--.

Col. 3, line 51
 replace "R4040"
 with --R-4040--.

Col. 3, line 52
 replace "R4200"
 with --R-4200--.

Col. 8, line 59
 replace "200"
 with --20--.

Col. 7, in the Formulations for Tire Puncture Sealant Table, line 5 (beginning with R4040), please add/delete the following:

UNITED STATES PATENT AND TRADEMARK OFFICE
CERTIFICATE OF CORRECTION

PATENT NO. : 5,856,376
DATED : January 5, 1999
INVENTOR(S) : Daniel W. Wong

It is certified that error appears in the above-identified patent and that said Letters Patent is hereby corrected as shown below:

col. 2, add --1--
col. 4, delete "1"
col. 6, add --1--
col. 7, delete "1"
col. 8, add --1--
col. 9, delete "1"
col. 10, add --1--

Signed and Sealed this

Eighth Day of June, 1999

*Attest:*

*Attesting Officer*

Q. TODD DICKINSON

*Acting Commissioner of Patents and Trademarks*